United States Patent [19]

Johns

[11] 4,035,191

[45] July 12, 1977

[54] TETRAGONALLY STABILIZED ZIRCONIA CERAMIC

[75] Inventor: Herbert L. Johns, Madison, Ohio

[73] Assignee: Corning Glass Works, Corning, N.Y.

[21] Appl. No.: 610,120

[22] Filed: Sept. 4, 1975

Related U.S. Application Data

[63] Continuation-in-part of Ser. No. 468,498, May 9, 1974, abandoned.

[51] Int. Cl.² ........................................... C04B 35/48
[52] U.S. Cl. .................................................. 106/57
[58] Field of Search ...................................... 106/57

[56] References Cited

U.S. PATENT DOCUMENTS

| 2,040,215 | 5/1936 | Rava | 106/57 |
|---|---|---|---|
| 2,427,034 | 9/1947 | Wainer | 106/57 |
| 3,410,728 | 11/1968 | Fullman et al. | 106/57 |

*Primary Examiner*—J. Poer

*Attorney, Agent, or Firm*—Richard N. Wardell; Clarence R. Patty, Jr.

[57] ABSTRACT

Mature zirconia ceramic compositions stabilized in the monoclinic and tetragonal structure with 0.1–5% ZnO and as little as 0.5% of a primary stabilizer selected from MgO, $Y_2O_3$ or combinations thereof. Compacted ceramic compositions are fired and matured at temperatures below the volatilization point of ZnO and in the range of 2750°–2950° F.

Zirconia is conventionally batched with magnesia, yttria or mixtures thereof, with or without other known stabilizers including ceria and calcia, together with up to about 5% ZnO and then compacted and sintered at a temperature which retains at least 0.1% ZnO in the fired body. Conventional cooling is prescribed. Subsequent thermal cycling of the fired body between 400° and 2500° F. reveals a stable body with no degradation in strength. Magnesia stabilized compositions show no signs of early destabilization on thermal cycling and may even show increasing room temperature strength as cycling progresses.

10 Claims, No Drawings

4,035,191

TETRAGONALLY STABILIZED ZIRCONIA CERAMIC

RELATED APPLICATION

This application is a continuation-in-part of the Applicant's prior copending application, Ser. No. 468,498, filed May 9, 1974, now abandoned.

BACKGROUND OF THE INVENTION

Magnesia stabilized zirconia fired ceramics are known in the art (see U.S. Pat. No. 3,365,317, for example). Magensia combinations with other stabilizers such as $Y_2O_3$, CaO, $CeO_2$ and $Cr_2O_3$ are also known in the art as available stabilizers for zirconia (see U.S. Pat. No. 2,040,215). Unfortunately however, magnesia-stabilized zirconia in the cubic structure form only remains so stabilized providing it is not subjected to long exposures (e.g., 50–60 hours) of temperatures within the range of 1,650° F. and 2,250° F. Within this temperature destabilization occurs, occasioned by the precipitation of periclase from the cubic $ZrO_2$ solid solution. As the periclase precipitates in that temperature range, the $ZrO_2$ cubic crystallites transform into the tetragonal structure then to the monoclinic form upon cooling with consequent volume changes and internal stresses which weaken the body. The destabilization is discussed in Ryshkewitch, Oxide Ceramics, Academic Press, (1964) page 358, et seq.

The destabilization of magnesia-stabilized zirconia may occur if the zirconia body is held for a period of time in the temperature range 1,650° to 2,550° F. What is more important, however, is that the destabilization may occur to the zirconia body during a use in which the body is exposed on many occasions for a relatively short time (maybe 2–3 hours) on each occasion, i.e., cycled through the 1,650°–2,550° F. range. This temperature cycling is typical of treatment afforded die nibs, setter plates, crucibles, metal pouring nozzles, heat exchangers, and grinding beads, among many other products formed of stabilized zirconia. The present invention is useful in products such as those mentioned.

The temperature cycle which the above products undergo in actual use is, in reality, room temperature up to the use temperature and back to room temperature. For a zirconia body, the more narrow range of 1,650°–2,550° F. is the most dangerous with respect to thermal stress and ultimately mechanical strength because the crystal structure changes on cooling in this range from tetragonal to monoclinic with a volume expansion of about 9%. To reinforce this instability range, the discussion herein may reiterate the 1,650°–2,550° F. temperatures, although the actual thermal cycling encompasses the larger range of 400° to 2,500° F.

The other cause of thermal stress in the zirconia body at all temperatures is the stress caused by rapid temperature changes which result in thermal gradients within the body. The magnitude of these stresses in the body and their effect on the strength are determined in part by the coefficient of thermal expansion of the material. These two causes of internal stress (structural transformation and thermal expansion) generally require narrow limits on the amount of stabilizer in the batch. Primarily, the stabilizer is a desirable addition which brings about stabilization of $ZrO_2$ into the cubic or tetragonal structure. Secondarily, the stabilizer also brings about an increase in the thermal expansion coefficient of the composition. With these considerations (and where the thermal expansion of the zirconia body must be kept low), the addition of any amount of stabilizer in excess of that required to bring about full stabilization would be detrimental to the ability of the body to withstand cyclical and rapid exposures to varying temperatures.

Experience in the art has shown that magnesia-stabilized zirconia bodies may be matured (viz., develop ceramic bonding and become impervious as observed by dye penetration) at greater than about 2.5% MgO when fired to within a wide range of temperatures. Unfortunately, the destabilization which was described above characterizes the magnesia-zirconia compositions.

Yttria, on the other hand, is not known to precipitate rapidly from zirconia solid solution, and therefore a zirconia body stabilized with yttria remains stable during thermal cycling over long periods of time. Yttria, however, must be present in quantities greater than 4% in order to produce a mature, partially stabilized zirconia refractory and greater than about 12% to produce a fully cubic body. The firing temperature should also be in excess of 3,000° F. to mature the body. Before the present invention, bodies containing less than 4% $Y_2O_3$ were not stable or impervious to dye penetration and not useful for most commercial applications because of low strength, high porosity and general immaturity.

In U.S. Pat. No. 2,427,034 (Wainer), zinc and other group II oxides were suggested as additives to MgO stabilized zirconias, but therein Wainer thought it necessary to have a $ZrO_2$:MgO mole ratio of between 1/2 and 2 for satisfactory fired bodies (i.e., at least about 14% by weight MgO), and in any case a greater molal percentage of magnesia than group II oxide in the body.

In U.S. Pat. No. 3,410,728, Fullman, et al., disclose the use of ZnO in stabilized zirconia to effect electric conductivity in a fuel cell. The patentees, however, define the stabilized zirconia as a compound with a cubic crystal structure and are therefore disclosing only conventional cubic stabilized bodies using relatively high levels of stabilizers.

SUMMARY OF THE INVENTION

The present invention has now found that a mature, thermal shock resistant zirconia ceramic body may be produced with as little as about 0.5% of a primary stabilizer selected from MgO, $Y_2O_3$, or combinations thereof if zinc oxide is blended with the refractory batch and fired with the compacted refractory to a temperature below the point at which ZnO completely volatilizes from the body and preferably within the range of about 2,750°–2,950° F.

Accordingly, the invention includes a mature, zirconia fired composition having less than 10% cubic phase and at least 5% tetragonal phase and consisting essentially of, by weight on the oxide basis, 0.1–5.0% ZnO and at least about 0.5% of a primary stabilizer selected from about 0.25% up to less than about 4% MgO, 0.25% up to less than about 4% $Y_2O_3$, and combinations thereof, the balance substantially being $ZrO_2$. The preferred fired composition of the invention comprises 0.5–3% MgO, 0.5–2% $Y_2O_3$, and 0.5–2.5% ZnO, the balance substantially being $ZrO_2$.

Contrary to the existing art, the ZnO addition of the present invention allows mature, stabilized zirconia refractories to be produced at firing temperatures of or below 2,950° F., wherein substantial cost saving can be made over current processes commonly requiring firing temperatures of 3,250° F. for mature stabilized refractories.

Finally, the ZnO addition of the present invention has been found to prevent or at least delay early destabilization of magnesia stabilized zirconia bodies and has even resulted in bodies showing increasing room temperature strength as the body is thermally cycled in the range of 400°-2,550° F.

The present invention, therefore, includes a method of producing a stabilized zirconia fired composition having less than 10% cubic structure and at least 5% tetragonal structure at room temperature and which does not destabilize in the range of 1,650°-2,550° F. comprising, (a) blending a raw material batch consisting essentially of, by weight on the oxide basis 0.1-5.0% ZnO, at least about 0.5% of a primary stabilizer selected from 0.25% up to less than about 4% MgO, 0.25% up to less than about 4% $Y_2O_3$ and combinations thereof, the balance substantially being $ZrO_2$, (b) shaping said batch into a green body, and (c) sintering said body to bring about ceramic bonding at a temperature above about 2,550° F. for a time after which at least 0.1% of the ZnO remains in the fired body, for example about 2,750°-2,950° F.

Additional known stabilizers including ceria and calcia may be used in conjunction with the present invention about detrimental effects on the zirconia refractory. Initial investigation of impurities on the strength of the fired zirconia indicates that strength may be affected by minor impurities of silica, alumina, phosphate and sulfur, so that it is preferred to limit the named impurities to less than one-half of one percent by weight of the batch.

DETAILED DESCRIPTION OF THE INVENTION

Pure zirconia is a material with a monoclinic structure at room temperature. As used in the art, fully stabilized zirconia is a material which, because of additions of various stabilizers, is made to assume an entirely cubic crystal structure. A partially stabilized zirconia, as used in the art, is a material which has both monoclinic and cubic structure, usually with at least 60% cubic.

The present invention is now suggesting the new term "tetrastabilization" as a third term to distinguish a zirconia material which is stabilized against crystal transformation and contains at least aboout 5% and up to 100% tetragonal structure with or without some quantity of monoclinic zirconia and less than 10% cubic zirconia therein.

In some prior art, "stable zirconia" has been used synonymously with "cubic zirconia". However, as used herein, the term stability or stable will refer to the physical, rather than structural, property of a body that enables the body to be cooled through the accepted normal polymorphic transformation temperature range and retain it's physical integrity. For example, a partially stabilized zirconia body with greater than about 40% monoclinic phase (<60% cubic) at room temperature may not survive a heat up and cool down through this temperature range because of thermal contraction and the opposed tetragonal to monoclinic volume expansion. However, the present invention has discovered that a body may be stable if it is fired at a low firing temperature with low levels of stabilizers so that it retains at least an effective amount of tetragonal phase (about 5%) at room temperature regardless of whether the remaining structure of the body is monoclinic or monoclinic with a small percentage of cubic.

Herein, fully stabilized will mean substantially fully cubic zirconia, partially stabilized will mean a stable body made up of cubic and monoclinic zirconia and tetrastabilized will mean a stable body made up of tetragonal zirconia (at least about 5% by volume) with less than 10% cubic and with any remainder being monoclinic.

The present inventor has found that an addition of a small quantity of ZnO to a zirconia plus magnesia raw material batch prior to firing can enable the zirconia to be tetrastabilized at low firing temperatures which then effectively prevents or at least delays destabilization of the zirconia.

In addition to preventing destabilization of zirconia bodies containing magnesia as a stabilizer, the zinc oxide addition of the present invention allows the production of mature, impervious tetrastabilized zirconia bodies with minor amounts of magnesia and/or yttria at firing temperatures below present commercial firing temperatures. Therefore, there is both a saving of raw material (magnesia or yttria) and a saving of time and energy in thermal processing. Of course, the price for these savings is the 0.1-5% addition of zinc oxide.

The inventor has found in bodies without zinc oxide, that about 2.5% or slightly less MgO or about 4% $Y_2O_3$ is necessary to produce mature partially stabilized zirconia bodies even at temperatures above 3,000° F.; but in bodies with about 1% ZnO, only about 0.5% of either MgO or $Y_2O_3$ separately or in combination is necessary for the same maturity and tetrastabilization at lower temperatures.

The firing temperature of the raw materials of the invention should be kept below the volatilization temperature of ZnO and above about 2,750° F. where the refractory bodies begin to mature. The inventor prefers that the firing temperature be 2,750°-2,950° F., a temperature that produces a fully dense, impervious body from the raw materials and develops the tetragonal zirconia phase. The upper limit 2,950° F. may be flexible upward. Its selection is based upon the fact that ZnO is part of the present invention, and therefore it must remain in the fired body. Consequently the firing must be carried out at a temperature and for a soak time which will not allow the complete volatilization of the ZnO. The inventor believes that the volatilization is fairly complete if the body slowly reaches a peak temperature of about 2,950° F., even with no hold time at that temperature. The inventor therefore prefers to fire at a rapid heat rate to a peak temperature of 2,750°-2,950° F. and without long hold times at the higher temperatures. Since volatilization takes place over a range of temperatures, the peak temperatures, heat rate and hold time may have to be adjusted in order to preserve ZnO in the fired body. If higher firing temperatures are desired, it may also be necessary to add an excess of ZnO to the raw material batch and subsequently allow a portion of it to volatilize. But whatever firing steps are carried out, at least 0.1% (preferably 0.5%) ZnO should remain in the fired body in order to mature the body at low MgO and/or $Y_2O_3$ levels. The use temperature of the zirconia bodies is also limited to below about 2,950° F. by this constraint.

Although the present invention concerns primarily zirconia with magnesia and/or yttria primary stabilizers, the inventor contemplates the use of his invention with zirconia bodies stabilized with any number of stabilizers, at least one of which is magnesia or yttria. Stabilizer is a term of the art which refers to various oxides which crystallize in the cubic or tetragonal structure, form solid solution in $ZrO_2$, and force $ZrO_2$ to assume a stable (with respect to physical properties) structure. The inventor contemplates allowing any of these additional stabilizers which do not interfere with the function of MgO and $Y_2O_3$ as stabilizers nor the tetragonal structure of the fired body. Specifically, zirconia bodies stabilized with magnesia and/or yttria plus one or more of CaO, $CeO_2$ and $Cr_2O_3$ have been studied with additions of ZnO therein. None of the other stabilizers has been found to have any detrimental effect on the ability to produce tetrastabilized zirconia. Additions of up to 2 weight percent CaO may be made in combination with MgO and/or $Y_2O_3$ in $ZrO_2$ bodies with good results, as may additions of $CeO_2$ and $Cr_2O_3$ up to 4%. These are practical and not absolute limits for the other stabilizers, however, as they appear not to have any adverse effect on the invention. Their presence in large quantities may cause additional cost and have adverse effects on other properties of the zirconia and for this reason would normally be kept quite low.

Adding additional primary stabilizer once the $ZrO_2$ is fully tetragonal may cause development of cubic zirconia or may also have adverse effects on the properties of the ceramic bodies. In the present invention, this consideration prompts the present inventor to select an upper limit for the MgO at about 4% by weight although additional MgO could be used. Furthermore, large additions of $Y_2O_3$ may be tolerated in the $ZrO_2$—ZnO composition without adverse effects on structure or strength, but the thermal expansion of the composition will be increased by the yttria addition. Therefore, the inventor prefers to add less than about either 4% MgO and/or 4% $Y_2O_3$ to completely tetrastabilize the $ZrO_2$ and maintain a low expansion in the fired refractory.

A similar argument holds for the ZnO addition since it could be introduced into the composition of the invention in large quantities (for example 10 weight percent). The large amount is not necessary, and the presence of ZnO should be kept under 5 weight percent with even less ZnO required if the total stabilizer level is held below 5%. The inventor prefers that the MgO level be kept in the range of 0.5–3% and the $Y_2O_3$ at 0.5–2%, in which case the ZnO may be present at 0.5–2.5 weight percent. In some applications the use of greater than 2% by weight ZnO may be detrimental. Particularly if the zirconia is used as a setter plate, care must be taken to avoid reactions between the ware being fired and any excessive ZnO in the setter.

Prior to this invention, the strength of magnesia-stabilized zirconia bodies decreased as the body was cycled through or held in the temperature range 1,650°–2,550° F. due to the precipitation of the MgO from the $ZrO_2$ solid solution. The inventor has now found with the ZnO addition to the magnesia stabilized bodies of the invention that the body may be fired at lower temperatures so that at least 5% tetragonal structure will be retained and the body will not destabilize as rapidly as prior art MgO stabilized bodies. The strength of the body not only does not decrease, but it may increase during initial cycling of the body. The thermal shock resistance of the material and its electrical properties as an ionic conductor, in addition to this retained strength, make the compositions of this invention well suited to use in oxygen sensing devices for automotive and other industrial applications.

DESCRIPTION OF THE PREFERRED EMBODIMENTS

All raw material additions were on the weight basis and purity of the raw materials was as follows:

|  |  | Purity | Major Impurities |  |
|---|---|---|---|---|
| $ZrO_2$ | (−325 mesh) | 99% | $SiO_2$ | 0.5% |
|  |  |  | CaO | 0.2% |
|  |  |  | MgO | 0.2% |
| MgO | (−325 mesh) | 99+% | CaO + $SiO_2$ | 0.4% |
| ZnO | (−325 mesh) | 99% | Soluble Salts | 0.38% |
|  |  |  | $SO_3$ | 0.11% |
|  |  |  | PbO | 0.06% |
| $Y_2O_3$ | (−325 mesh) | 76.4% | $Dy_2O_3$ | 14.2% |
|  |  |  | $Er_2O_3$ | 6.1% |
| $CeO_2$ | (−325 mesh) | 99+% | Rare Earths | <1.0% |

EXAMPLE 1

Insufficient levels of primary stabilizers without ZnO additions were tried in a $ZrO_2$ raw batch.

A batch consisting of 99% $ZrO_2$, 0.5% MgO and 0.5% $Y_2O_3$ was ball milled for 20 hours with 40% water, 3% organic binder and 0.25% methyl cellulose by weight based on the dry batch. The batch was dried, screened through a 28 Tyler mesh sieve, and pressed at 5,000 psi into bars 4 × 0.5 × 0.5. Firing proceeded at about 450°/hour to 2000° F. where the temperature was held for 8 hours before proceeding at about 100°/hour to 2,400° F. Thereafter the peak temperature of 2,800° F. was reached in 1 hour. Forced air was used to rapidly cool the bodies.

Thermal cycling of the fired bodies took place in the temperature range of 400° to 2,500° F. with one heat up and cool down being one cycle. The modulus of rupture (hereafter MOR) was determined by breaking the bars under 4 point loading. The results showed that the as-fired bodies had a MOR of less than 3,500 psi, which after 10 thermal cycles dropped to less than 1,000 psi, actually too weak to be measured with the available equipment.

EXAMPLE 2

Insufficient stabilizer levels of Example 1 were made sufficient to produce a mature body with an addition of ZnO.

Bodies were made according to the procedure of Example 1 and using the same stabilizer level but also including ZnO as follows:

| $ZrO_2$ | MgO | $Y_2O_3$ | ZnO |
|---|---|---|---|
| 98.5% | 0.5% | 0.5% | 0.5% |

The firing schedule of Example 1 was also followed with the resulting fired bodies showing greatly increased fired strengths and strengths after thermal cycling over those of the compositions of Example 1. In this example (with the ZnO addition), the fired MOR was 21,740 psi and the MOR after 20 cycles was 23,193 psi. The increase in measured strength is within the range of testing accuracy.

Additional samples made according to Example 1 but with 0.5% ZnO were examined by X-ray techniques to determine the phases present. The analysis showed 90% monoclinic and 10% tetragonal by volume. The X-ray technique was estimated to be accurate to within at least 5%.

EXAMPLE 3

ZnO lowers the MgO stabilizer requirement for mature refractories.

Compositions were batched, milled, dried, pressed, and fired as described in Example 1 to compare the difference in zirconia bodies stabilized with 1% MgO with and without ZnO. The results clearly indicate that the body without the ZnO never matured and developed the strength as did the body made according to the invention. Furthermore, the samples show differing results after thermal cycling, the body made according to the invention displaying at least equal strength before and after cycling.

|  |  |  | Fired MOR | MOR After 20 Cycles |
|---|---|---|---|---|
| 98% $ZrO_2$ | 1% MgO | 1% ZnO | 11,536 psi | 12,400 psi |
| 99% $ZrO_2$ | 1% MgO |  | 7,200 psi | 6,000 psi |

Additional samples of the composition containing ZnO were fabricated and analyzed for phases. The fired composition was found to be about 90% monoclinic, about 5% tetragonal and less than 5% cubic.

EXAMPLE 4

Zinc oxide aids the strength of MgO-$Y_2O_3$ stabilized zirconias after thermal cycling.

Bars were again fabricated according to the standard procedure of Example 1 using varying amounts of MgO and $Y_2O_3$ in combination with 1% ZnO. The strength of the bodies actually showed an increase after 20 thermal cycles. The firing temperature was again 2,800° F.

Additional samples of composition B were fabricated for X-ray analysis. The phases found were tetragonal (about 80%) and monoclinic (balance).

|  | Composition | | | |
|---|---|---|---|---|
|  | % $ZrO_2$ | % MgO | % $Y_2O_3$ | % ZnO |
| A | 94 | 4 | 1 | 1 |
| B | 95 | 2 | 2 | 1 |
| C | 97 | 1 | 1 | 1 |
|  | Properties | | | |
|  | Fired MOR (psi) | | MOR After 20 Cycles (psi) | |
| A | 14,500 | | 28,200 | |
| B | 5,800 | | 22,000 | |
| C | 10,500 | | 28,500 | |

EXAMPLE 5

Insufficient levels of $Y_2O_3$ without ZnO were examined in fired zirconia bars.

Sample bars were prepared as in Example 1 with yttria as the only stabilizer and with a range of firing temperatures. Zirconia batches with 1%, 2%, and 4% $Y_2O_3$ were each studied at four different firing temperatures. Results are shown in Table 1. A body with less than about 1% porosity is impervious to dye penetration and may be considered mature. Samples which had little stability and which were too weak to test are marked "crumbled."

Table 1

| Composition | Firing Temperature | Porosity (%) | As Fired MOR (psi) |
|---|---|---|---|
| 99% $ZrO_2$ 1% $Y_2O_3$ | 2850° F. | 21.4 | 5,628 |
|  | 2950° F. | 18.7 | 5,000 |
|  | 3150° F. | — | crumbled |
|  | 3250° F. | — | crumbled |
| 98% $ZrO_2$ 2% $Y_2O_3$ | 2850° F. | 3.1 | 3,900 |
|  | 2950° F. | 6.3 | 4,500 |
|  | 3150° F. | — | crumbled |
|  | 3250° F. | — | crumbled |
| 96% $ZrO_2$ 4% $Y_2O_3$ | 2850° F. | 12.5 | 9,643 |
|  | 2950° F. | 8.5 | 8,389 |
|  | 3150° F. | 0.4 | no data |
|  | 3250° F. | — | crumbled |

The results show that mature impervious bodies are not produced below the 3,150° F. firing at any level of $Y_2O_3$ and that bodies fired at 3,150° F. and above are destroyed upon cooling by the combination of thermal contraction and structural expansion, the latter resulting from insufficient stabilizer to maintain even partial cubic stabilization of the body.

One of the 96% $ZrO_2$/4% $Y_2O_3$ bars was cycled 20 times through the 400° – 2,500° – 400° F. cycle with no significant change in strength.

EXAMPLE 6

Insufficient levels of $Y_2O_3$ were made sufficient to produce mature zirconia bodies by the addition of ZnO and firing at low temperatures to develop the tetragonal zirconia.

Sample bars were prepared and fired as in the previous example but with 1% ZnO added to each composition at the expense of the $ZrO_2$. Results for the 3,150° and 3,250° F. firings should be and are similar to the results of the previous example because ZnO substantially volatilizes at temperatures above about 2,950° F. Porosities in this example are somewhat higher for the 3,150° F. and 3,250° F. firings than the previous example, possibly due to the escaping ZnO.

The results in Table II also indicate, contrary to the previous example, that impervious bodies can be produced with less than 4% $Y_2O_3$ at firing temperatures of 2,950° and 2,850° F. Bodies with little strength are again marked as "crumbled". A 95% $ZrO_2$/4% $Y_2O_3$/1% ZnO sample fired to 2,850° F. was also cycled through 20 cycles with no significant change in the strength.

Samples having 1% ZnO and 2% $Y_2O_3$ with the balance $ZrO_2$ were fabricated and analyzed for structure. The structure was found to be about 80% monoclinic and about 20% tetragonal. A 1% ZnO, 4% $Y_2O_3$, balance $ZrO_2$ body was also fabricated and found to have about 60% monoclinic and about 40% tetragonal structure.

Table II

| Composition | Firing Temperature | Porosity (%) | As Fired MOR (psi) |
| --- | --- | --- | --- |
| 98% $ZrO_2$ 1% $Y_2O_3$ 1% ZnO | 2850° F. | 1.0 | 16,052 |
| | 2950° F. | 0.50 | 15,402 |
| | 3150° F. | — | crumbled |
| | 3250° F. | — | crumbled |
| 97% $ZrO_2$ 2% $Y_2O_3$ 1% ZnO | 2850° F. | 0.32 | 16,875 |
| | 2950° F. | 0.51 | 15,500 |
| | 3150° F. | — | crumbled |
| | 3250° F. | — | crumbled |
| 95% $ZrO_2$ 4% $Y_2O_3$ 1% ZnO | 2850° F. | 0.35 | 12.273 |
| | 2950° F. | 0.4 | 19,359 |
| | 3150° F. | — | crumbled |
| | 3250° F. | — | crumbled |

EXAMPLE 7

Additional stabilizers are not detrimental to the invention.

Bodies were again prepared and fired as described in Example 1, this time using a composition consisting of 93.5% $ZrO_2$, 2.0% $Y_2O_3$, 3.0% MgO, 0.5% $CeO_2$, and 1.0% ZnO, all by weight percent. The initial average MOR on the fired bars was 12,024 psi and after 25 cycles between 400° and 2,500° F. the MOR increased to 14,900 psi.

EXAMPLE 8

ZnO in MgO-$Y_2O_3$ Slip Cast, Stabilized $ZrO_2$ Bodies

Stabilized zirconia compositions of the invention may be produced by other ceramic forming processes.

A raw material batch of 95% $ZrO_2$, 2.0% MgO, 2.0% $Y_2O_3$ and 1.0% ZnO (all -325 Tyler mesh particle size) was milled for 16 hours with 25% deionized, water, 0.5% ammonium alginate and 0.01% Darvan No. 7 (all liquid additions by weight percent on the basis of the dry batch). It is understood that other deflocculants as known in the art which are suitable for producing a good non-clay casting slip may be substituted for the Darvan No. 7. Darvan No. 7 is a trade name for an alkyl naphthalene sulfonic acid sodium salt marketed by R. T. Vanderbilt Corporation.

After milling, the suspension was screened through a 325 Tyler mesh screen and de-aired in a vacuum chamber. Bars 4 × 0.5 × 0.5 inch were cast in plaster molds and the bodies dried upon removal from the molds. The firing schedule of Example 1 was observed, viz., 450°/hour to 2,000° F., hold 8 hours; 100°/hour to 2,400° F.; 400° F./hour to 2,800° F.; forced air cooling.

Modulus of rupture data showed an increased MOR resulted from cycling the bars in the temperature range of 400°–2,500° F. The MOR for the fired, slip cast body was higher than for the pressed body B from Example 4 (same composition) but the strengths after cycling were well correlated.

| Slip Cast Composition | MOR (fired) | MOR (20 cycles, 400° F. – 2500° F. – 400° F.) |
| --- | --- | --- |
| 95 $ZrO_2$<br>2 MgO<br>2 $Y_2O_3$<br>1 ZnO | 12,800 psi | 25,600 psi |

EXAMPLE 9

Bodies were again prepared and fired as described in Example 1 but with a composition of 4% MgO, 4% $Y_2O_3$, 1% ZnO with the balance $ZrO_2$. Fired samples of these bodies were phase analyzed and found to be substantially fully cubic.

I claim:

1. A mature, tetrastabilized zironcia fired composition consisting essentially of, by weight on the oxide basis, 0.1–5.0% ZnO and at least 0.5% of a primary stabilizer selected from 0.25% up to less than about 4% MgO, 0.25% up to less than about 4% $Y_2O_3$ and combinations thereof, the balance substantially being $ZrO_2$, said fired composition having less than 10% cubic structure and at least 5% tetragonal structure by volume at room temperature.

2. A method of producing a tetrastabilized zirconia fired composition having less than 10% cubic structure and at least 5% tetragonal structure at room temperature and being characterized by a retained strength upon thermal cycling below 2,900° F. comprising,
   a. blending a raw material batch consisting essentially of, by weight on the oxide basis 0.1–5.0% ZnO, at least 0.5% of a primary stabilizer selected from 0.25 up to less than about 4% MgO, 0.25 up to less than about 4% $Y_2O_3$ and combinations thereof, the balance substantially being $ZrO_2$,
   b. shaping said batch into a green body, and
   c. sintering said body to bring about ceramic bonding at a temperature above about 2,550° F. for a time after which at least 0.1% of the ZnO remains in the fired body.

3. The method of claim 2 wherein said firing temperature is less than about 2,950° F.

4. A mature, tetrastabilizer zirconia fired composition consisting essentially of, by weight on the oxide basis, 0.1–5.0% ZnO and 0.25% up to less than about 4% MgO, the balance substantially being $ZrO_2$, said zirconia composition being less than 10% cubic structure and more than 5% tetragonal structure at room temperature and being characterized by a retained strength and lack of early destabilization upon thermal cycling or holding at temperatures in the range of about 1,650°–2,550° F.

5. A method of producing a tetrastabilized zirconia fired composition having less than 10% cubic structure at room temperature and which does not rapidly destabilize upon thermal cycling or holding at temperatures in the range of 1,650°–2,550° F. comprising
   a. blending a raw material batch consisting essentially of, by weight on the oxide basis, 0.1–5.0% ZnO, 0.5% up to less than about 4% MgO, the balance substantially being $ZrO_2$,
   b. shaping said batch into a green body, and
   c. sintering said body to bring about ceramic bonding at a temperature above about 2,550° F. for a time after which at least 0.1% of said ZnO remains in the body.

6. The method of claim 5 wherein said firing temperature is less than about 2,950° F.

7. The fired composition of claim 1 consisting essentially of, by weight on the oxide basis, 0.5-3% MgO, 0.5-2% $Y_2O_3$, 0.5-2.5% ZnO and the balance substantially being $ZrO_2$.

8. The fired composition of claim 1 wherein ZnO is not more than 2% by weight.

9. The fired composition of claim 1 wherein the balance consists of $ZrO_2$ plus less than 0.5% by weight of minor impurities.

10. The fired composition of claim 7 wherein the balance consists of $ZrO_2$ plus less than 0.5% by weight of minor impurities.

* * * * *

UNITED STATES PATENT AND TRADEMARK OFFICE
CERTIFICATE OF CORRECTION

PATENT NO. : 4,035,191
DATED : July 12, 1977
INVENTOR(S) : Herbert L. Johns

It is certified that error appears in the above—identified patent and that said Letters Patent are hereby corrected as shown below:

Column 1, line 20, change "2250°F" to -- 2550°F -- .

Signed and Sealed this

Twenty-fifth Day of October 1977

[SEAL]

Attest:

RUTH C. MASON
Attesting Officer

LUTRELLE F. PARKER
Acting Commissioner of Patents and Trademarks